United States Patent Office 2,824,463
Patented Feb. 25, 1958

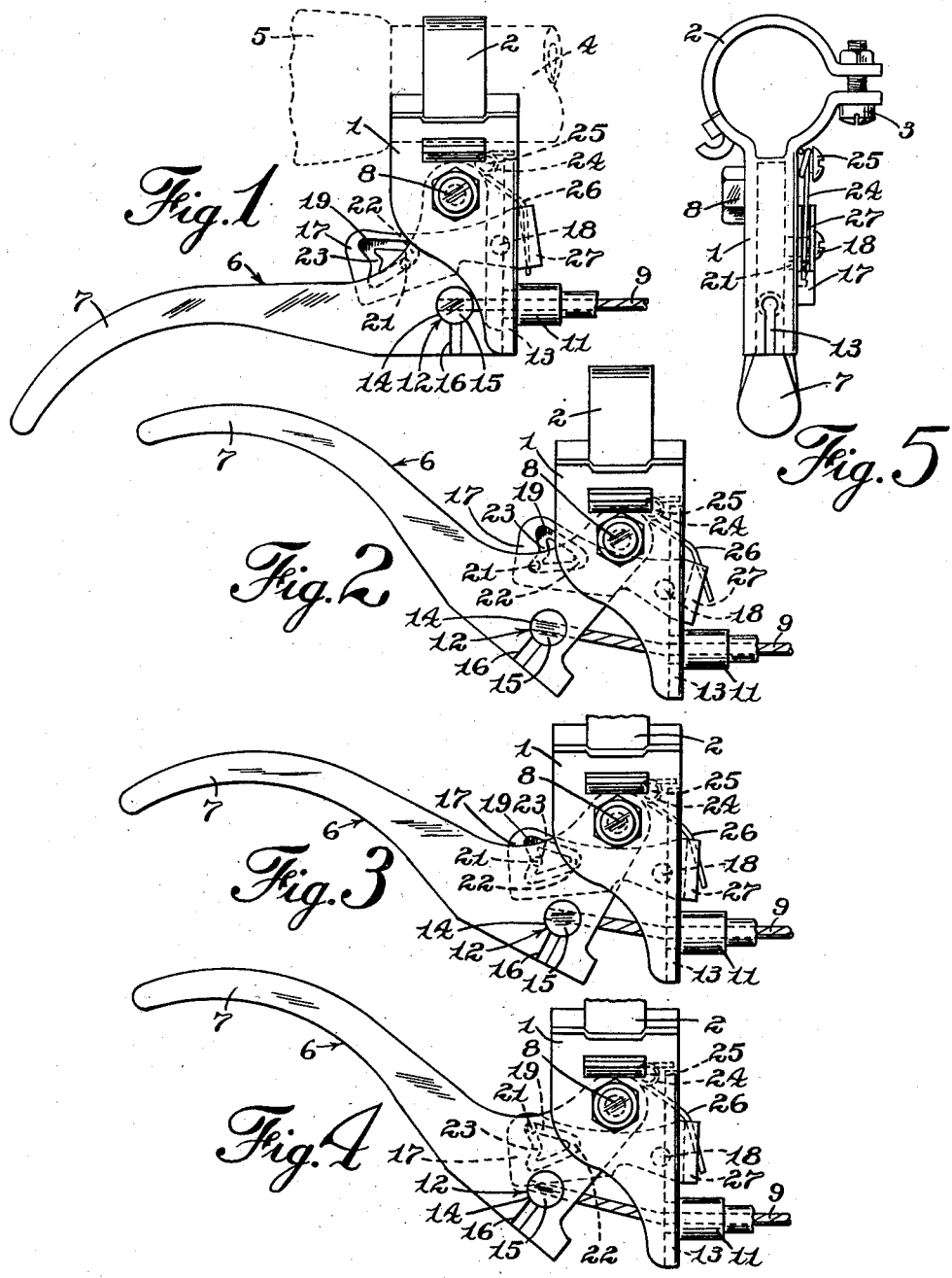

2,824,463

FLEXIBLE CABLE OPERATING MECHANISM FOR TWO-SPEED BICYCLE GEARING

Hollis K. Gleasman, Elmira, and Anthony J. Strozinski, Horseheads, N. Y., assignors to Bendix Aviation Corporation, Elmira Heights, N. Y., a corporation of Delaware Application April 30, 1954, Serial No. 426,856

2 Claims. (Cl. 74—489)

The present invention relates to flexible cable operating mechanism for two-speed bicycle gearing, and more particularly to a manually actuated device for remotely controlling such gearing.

It is an object of the present invention to provide a novel operating device of the above type which is economical to manufacture and convenient to install and operate.

It is another object to provide such a device which incorporates an operating lever and an automatic latching means for maintaining said lever in shifted position.

It is another object to provide such a device in which the latch is released by subsequent shifting actuation of said lever.

It is another object to provide such a device incorporating a novel structure for anchoring the cable to the operating lever which is easily assembled and provides a secure pivotal connection.

Further objects and advantages will be apparent from the following description taken in connection with the accompanying drawing in which:

Fig. 1 is a side elevation of a preferred embodiment of the invention showing the parts in the normal or low-speed position of the parts;

Fig. 2 is a view similar to Fig. 1 showing the operating lever at the end of its stroke which shifts the gearing into high gear;

Fig. 3 is a similar view showing the operating lever latched in its high-speed position.

Fig. 4 is a similar view showing the position of the parts when the operating handle is again actuated;

Fig. 5 is an end view of the device looking from the right in Fig. 1.

In Figs. 1 and 5 of the drawing there is illustrated a frame or holder 1 arranged to be clamped by means of a strap or bracket 2 and bolt 3 in a position which is convenient for manipulation by the operator of the bicycle, as for instance on the handle bar 4 adjacent the grip 5 as indicated.

Operating lever 6 comprising a handle portion 7 is pivotally mounted in the frame 1 as indicated at 8, and a cable 9 passes through a guide nipple 11 in the frame and is anchored at an intermediate point in the lever 6 as indicated at 12. The cable 9 is arranged to extend through suitable sheath or guide members not illustrated to the shifting mechanism for the gearing which as presently contemplated is in the form illustrated in the patent to Hood 2,609,712 issued September 9, 1952, to the assignee of the present application. In such use the cable 9 is attached to the bell-crank lever 34 of Hood at the point 37 as described in lines 32 to 38 of column 2 of the Hood specification.

The end of the cable 9 is pivotally connected to the lever 6 and for this purpose the lever is provided with a longitudinally extending slot 13 (Fig. 5) which is sufficiently wide to slidably receive said cable, and on each side of the slot the lever is formed with aligned bearing openings 14 for the reception of a cross pin 15. The cable 9 traverses a centrally located transverse opening in the pin 15 and is fixed therein in any suitable manner as by soldering or brazing.

The lever 6 is also provided with a transverse slot 16 capable of slidably receiving the cable which slot intersects the longitudinal slot and opens into the aligned bearing openings 14 at a point beneath said openings where it is spaced angularly from the operative range of movement of the cable with respect to the lever 6.

Means are provided for releasably holding the lever 6 in its upper or high-speed position, here shown in the form of a latch member 17 pivoted to the frame 1 near one end as indicated at 18, and having a heart-shaped cam groove 19 formed therein. A pin 21 is mounted in the lever 6 in position to project into the groove 19 and thereby connect the latch to said lever. The shape of the groove 19 is such that it provides two dwells 22 and 23 defining the low-speed and high-speed positions respectively of the lever 6.

In order to control the action of the latch member 17, a spring member 24 is mounted on the frame 1 as by means of a stud 25 (Fig. 5) and has a projecting arm 26 entering a slot 27 in the end of the latch 17. The bottom of the slot 27 is flat, and the end 26 of the spring is substantially straight so that the pressure of the spring tends to return the latch to its normal position as shown in Fig. 1 when it has been deflected therefrom.

In assembling the device, the cable 9 is first anchored to the lever 6 by introducing the pin 15 and the cable sidewise through the bearings 14 and transverse slot 16. After the pin and cable are centered in the lever, the pin and cable are rotated through substantially 90° in a counter-clockwise direction and then the assembly is introduced into the frame 1 and the lever is pivoted therein by means of bolt 8. The latch 17 is then mounted on the frame 1, with its slot 19 receiving the pin 21 of the lever 6.

In operation, starting with the parts in the low-speed position as shown in Fig. 1 raising of the handle 7 by the operator moves the lever 6 into the position shown in Fig. 2 in which the gearing is shifted to its high-speed position as illustrated in the Hood patent and at the same time the pin 21 on said lever moves to the end of the lower lobe of the cam slot 19 in the latch. At this time the end 26 of the spring 24 bears on the upper end of the slot 27 of the latch, thereby tending to rotate the latch in a counter-clockwise direction. When the operator relaxes his grip of the handle 7 the pin 21 of the lever is thus caused to move into the dwell position 23 as shown in Fig. 3, thereby holding the gearing in high-speed position.

When it is desired to move back into the low-gear position the operator grasps the handle 7, causing the pin 21 to move up into the upper lobe of the cam slot 19 as shown in Fig. 4. When the operator thereupon relaxes his grip, the pin 21 moves back to the low-speed dwell position 22 and slightly beyond, as shown in Fig. 1, by reason of the action of spring 24, the end 26 of which at this time is applying pressure to the latch tending to rotate it in a clockwise direction whereby the device shifts into high gear upon the next operation of the handle 7.

Although but one embodiment of the invention has been shown and described in detail it will be understood that other embodiments are possible and changes may be made in the precise form and arrangement of the parts without departing from the spirit of the invention.

We claim:

1. Flexible cable operating means for two-speed bicycle gearing including a frame, means for clamping the frame on a bicycle at a location convenient to the operator, an operating lever pivoted to the frame, a flexible cable attached to the lever to be placed under tension by actuation of the lever, and means responsive to such actuation for holding the lever in actuated position, and responsive to a second actuation of the lever to release the lever, said means comprising a lateral projection on the lever and a latch member pivotally mounted on the frame having a groove forming a heart-shaped closed path slidably receiving said projection and providing a high-gear dwell position and a low-gear dwell position; and a spring mounted on the frame, bearing on the latch member and operative to bias the latch to an intermediate position whereby operation of the lever causes the projection to traverse said closed path.

2. A device as set forth in claim 1 in which the latch is pivoted at an intermediate point in its length, said groove being formed near one end; the other end of the latch having a flat surface substantially normal to the longitudinal axis of the latch, and said spring having a straight portion engaging said surface to thereby urge the latch toward its intermediate position.

References Cited in the file of this patent

UNITED STATES PATENTS

| | | |
|---|---|---|
| 1,000,936 | Owen | Aug. 15, 1911 |
| 1,394,663 | Brennan | Oct. 25, 1921 |
| 1,555,629 | Brenne | Sept. 29, 1925 |
| 2,485,015 | Radke | Oct. 18, 1949 |

FOREIGN PATENTS

| | | |
|---|---|---|
| 518,932 | Great Britain | Mar. 12, 1940 |
| 651,239 | Great Britain | Mar. 14, 1951 |